(12) United States Patent
Westersten

(10) Patent No.: US 7,701,204 B2
(45) Date of Patent: Apr. 20, 2010

(54) METAL DETECTOR WITH RELIABLE IDENTIFICATION OF FERROUS AND NON-FERROUS METALS IN SOILS WITH VARYING MINERAL CONTENT

(76) Inventor: Allan Westersten, P.O. Box 50, Georgetown, CA (US) 95634-0050

( * ) Notice: Subject to any disclaimer, the term of this patent is extended or adjusted under 35 U.S.C. 154(b) by 918 days.

(21) Appl. No.: 11/223,705

(22) Filed: Sep. 9, 2005

(65) Prior Publication Data

US 2008/0224704 A1    Sep. 18, 2008

Related U.S. Application Data

(60) Provisional application No. 60/611,070, filed on Sep. 15, 2004.

(51) Int. Cl.
*G01N 27/72* (2006.01)
*G01V 3/10* (2006.01)

(52) U.S. Cl. .................. 324/228; 324/225; 324/329; 324/326; 324/239

(58) Field of Classification Search ......... 324/326–329, 324/232, 239–243, 207.17
See application file for complete search history.

(56) References Cited

U.S. PATENT DOCUMENTS

| | | | | |
|---|---|---|---|---|
| 4,890,064 A | * | 12/1989 | Candy | 324/329 |
| 4,906,973 A | * | 3/1990 | Karbowski et al. | 340/551 |
| 6,437,573 B1 | * | 8/2002 | Golder et al. | 324/329 |
| 6,642,711 B2 | * | 11/2003 | Kawate et al. | 324/207.17 |

* cited by examiner

*Primary Examiner*—Jay M Patidar

(57) ABSTRACT

A pulse-induction type metal detector that reliably identifies ferrous and non-ferrous targets in soils with varying mineral content. The influence of the background signals from the soil is removed continuously, without the need for manual adjustment of controls by the operator, when the soil mineralization changes. The background signals are removed without affecting the sensitivity of the detector to metallic targets and the background signal removal process does not make the detector insensitive to targets whose time constant coincides with that of the soil.

1 Claim, 15 Drawing Sheets

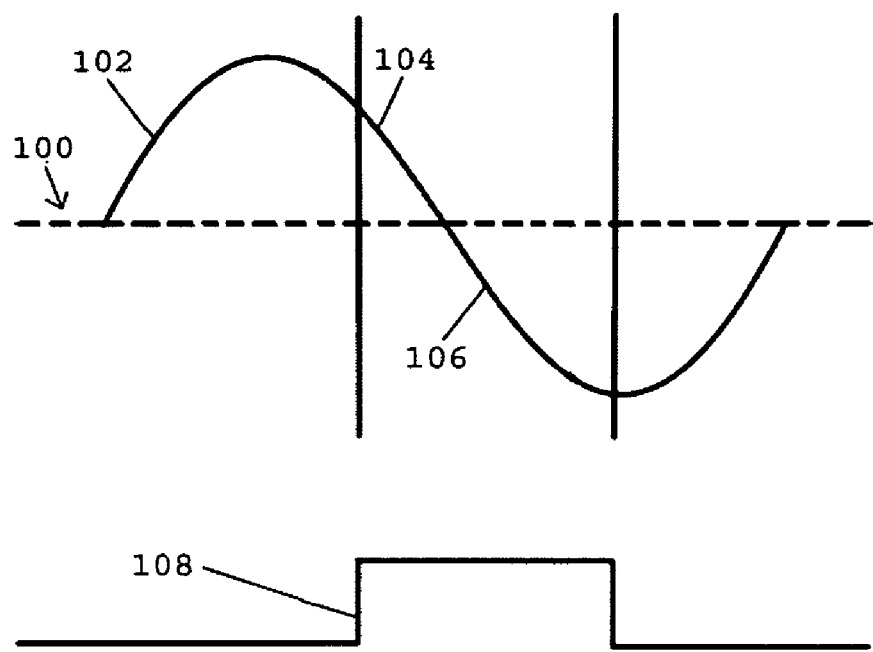
FIG. 2            PRIOR ART

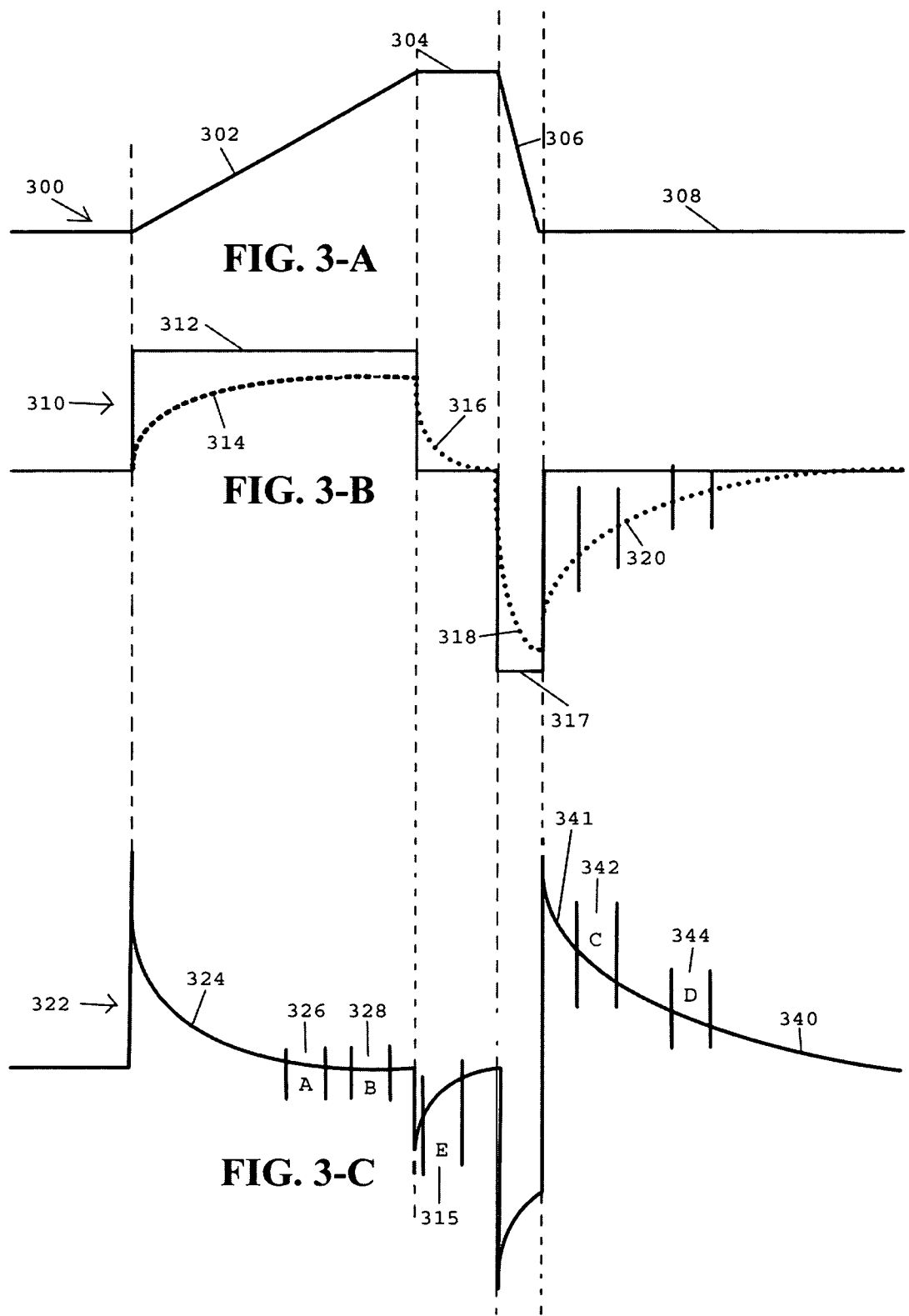

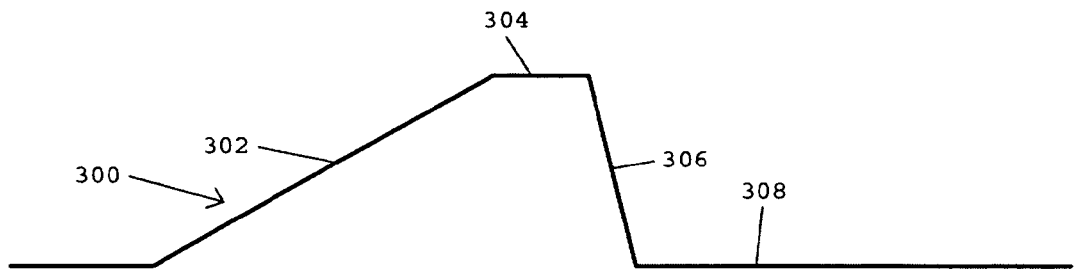
FIG. 4-A
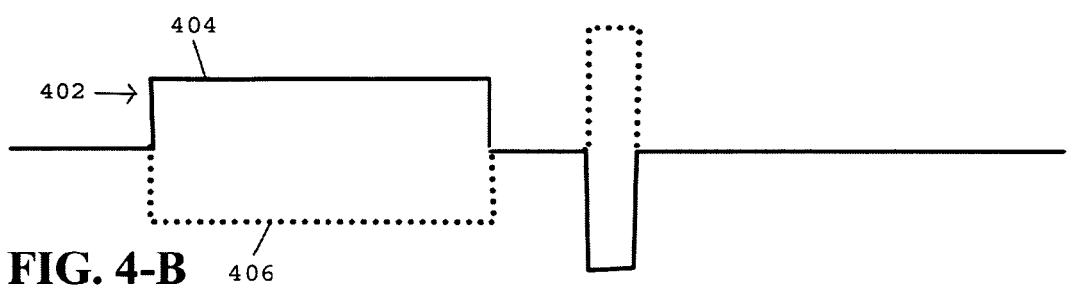
FIG. 4-B
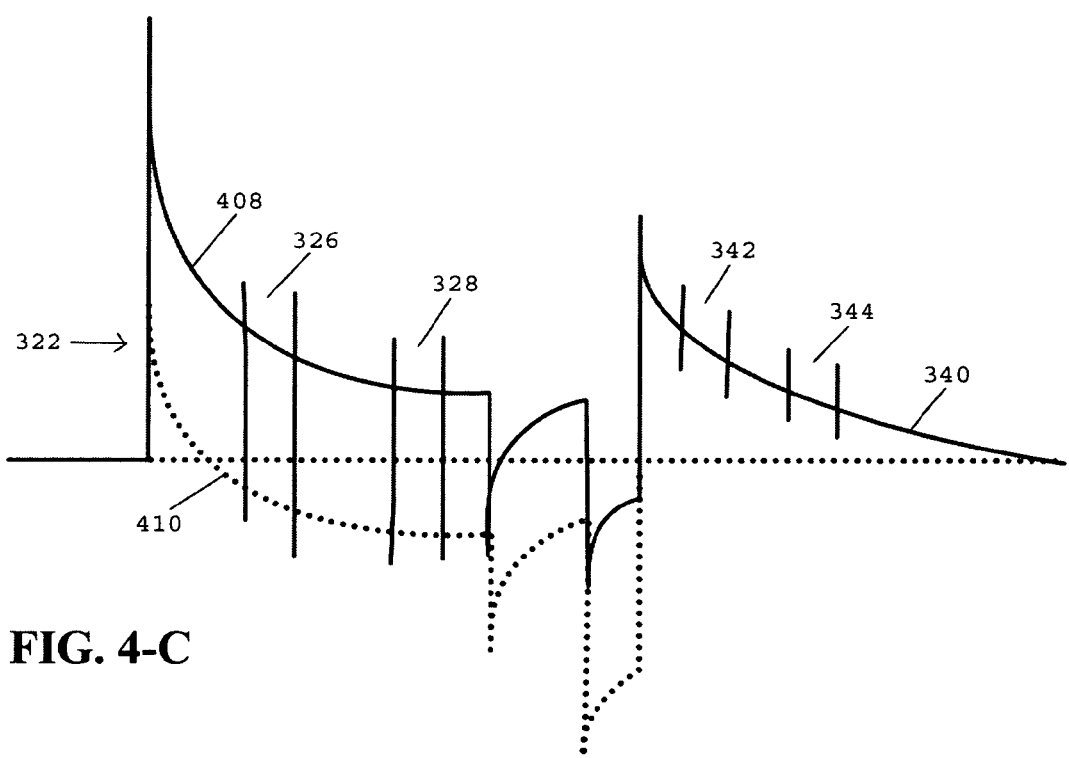
FIG. 4-C

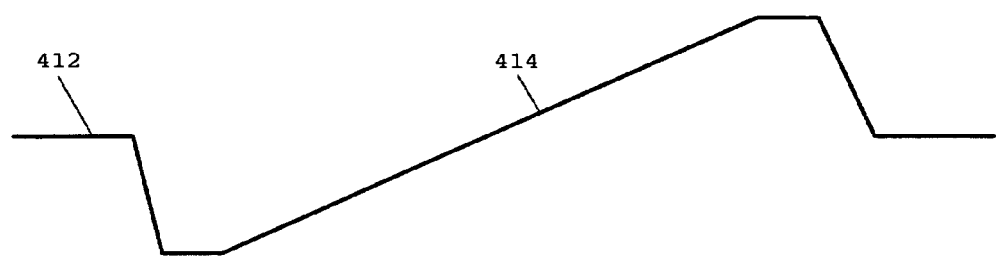
FIG. 4-D
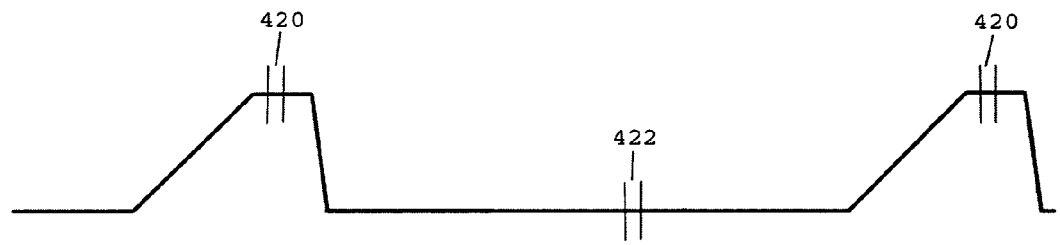
FIG. 4-E
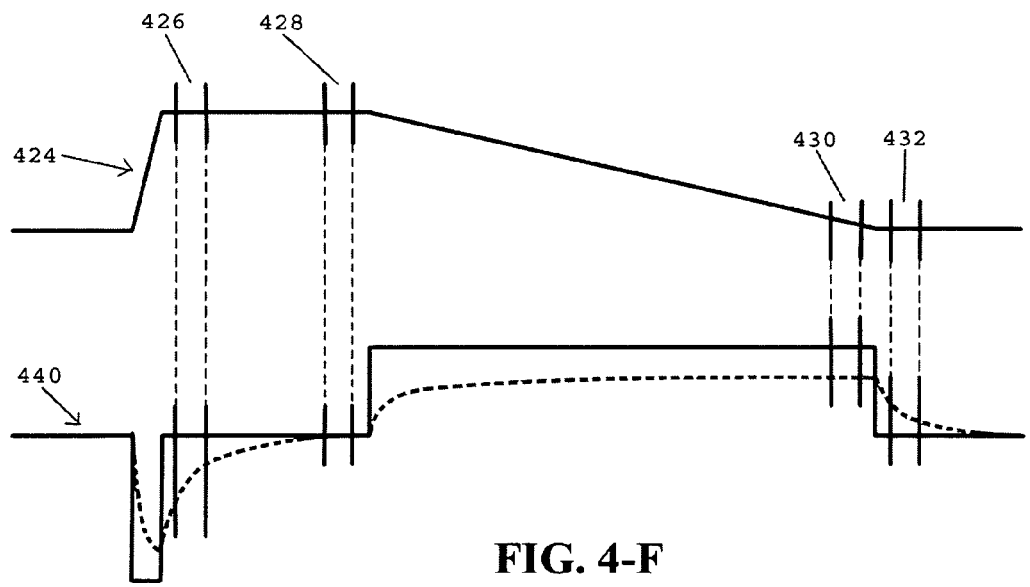
FIG. 4-F

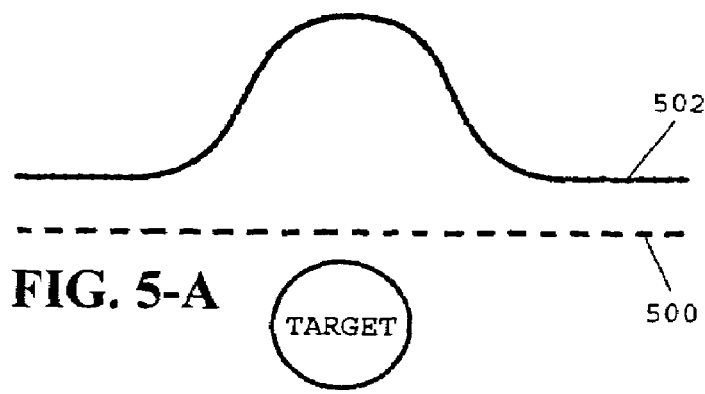
FIG. 5-A
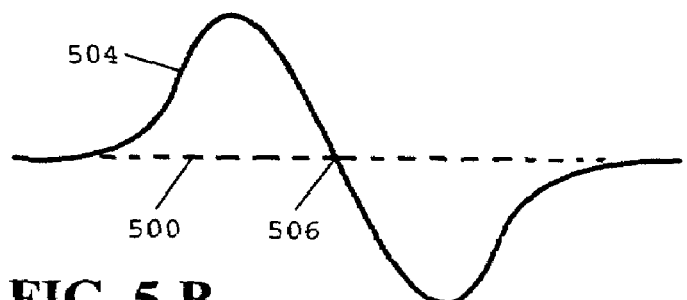
FIG. 5-B
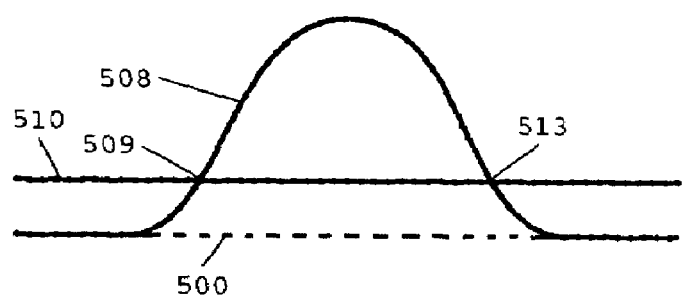
FIG. 5-C
FIG. 5-D
FIG. 5-E

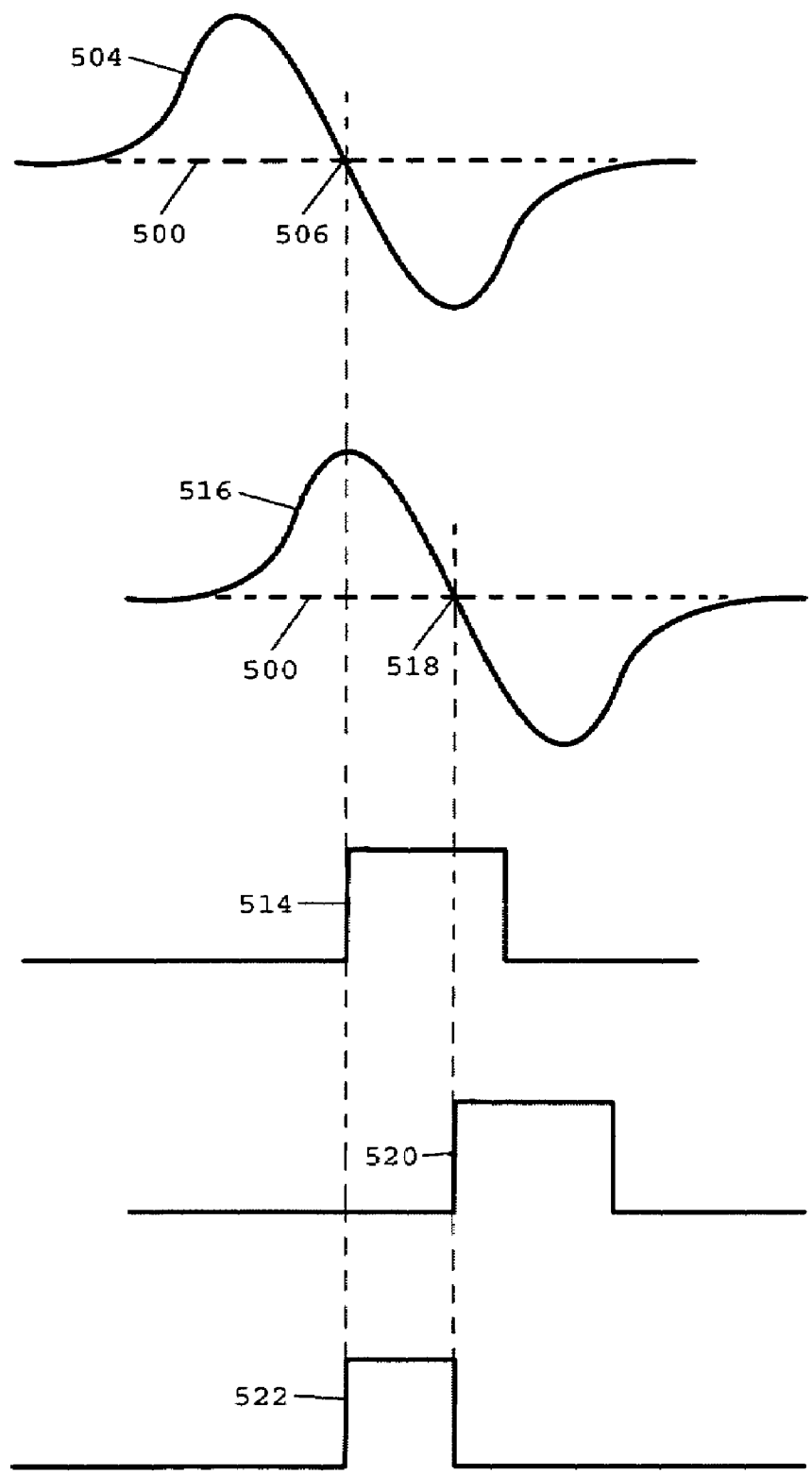
Fig. 5-F

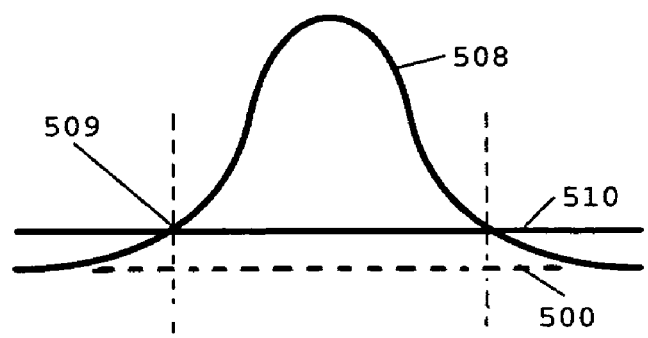
FIG. 6-A
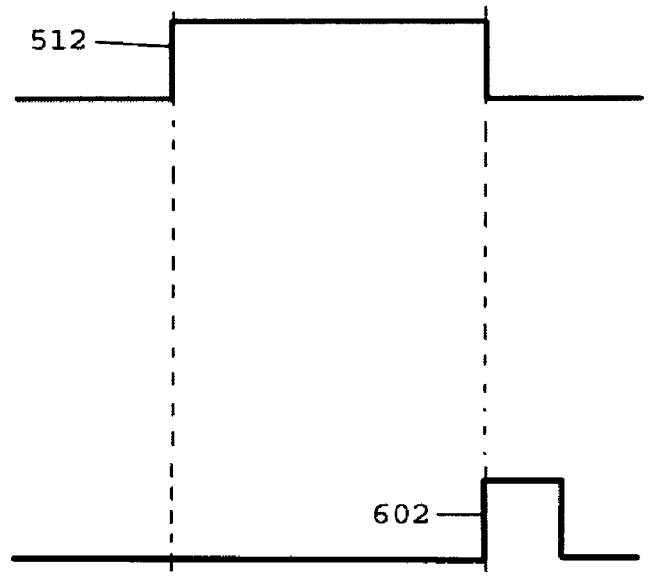
FIG. 6-B
FIG. 6-C
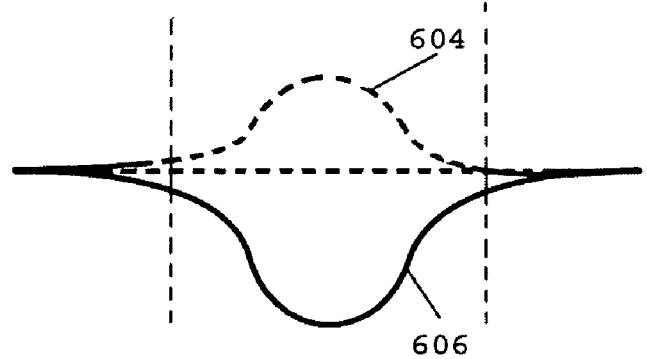
FIG. 6-D

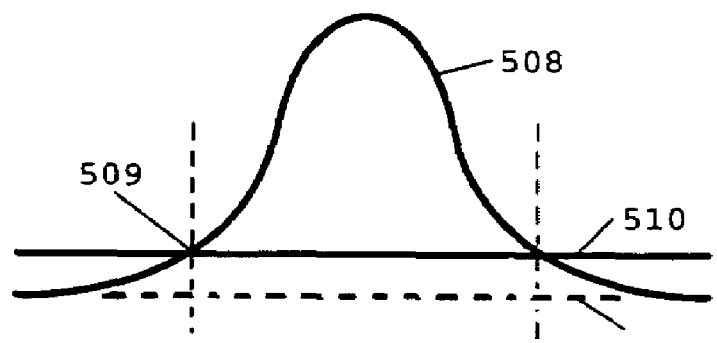
FIG. 7-A
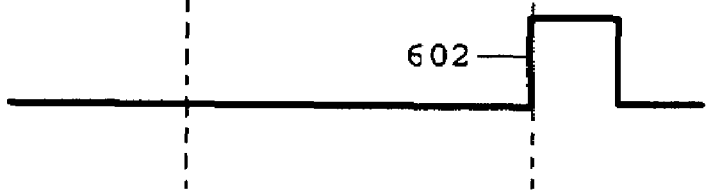
FIG. 7-B
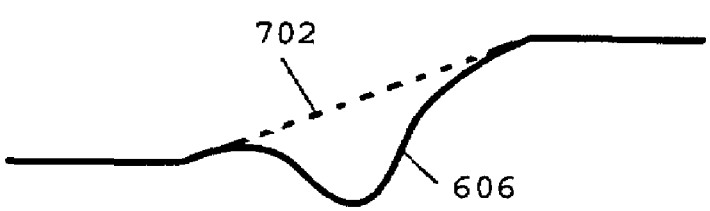
FIG. 7-C
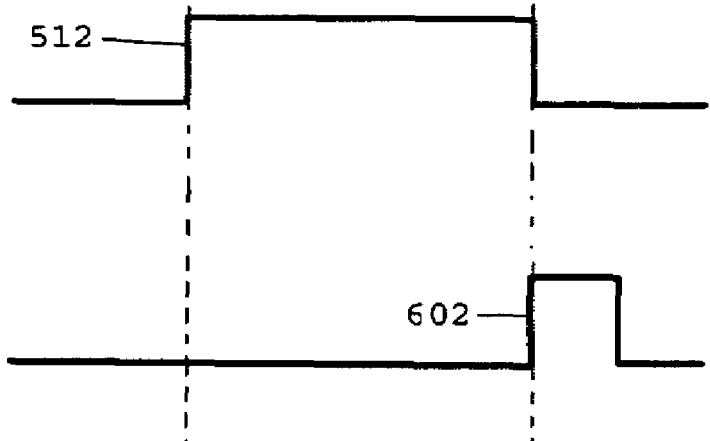
FIG. 7-D
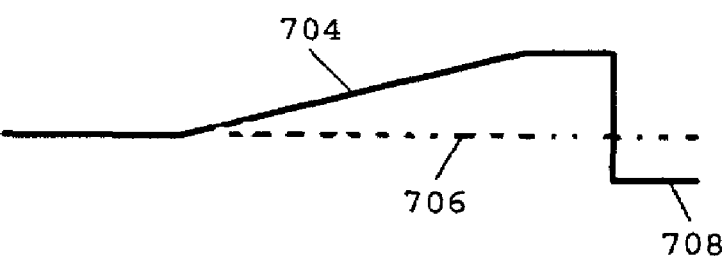
FIG. 7-E

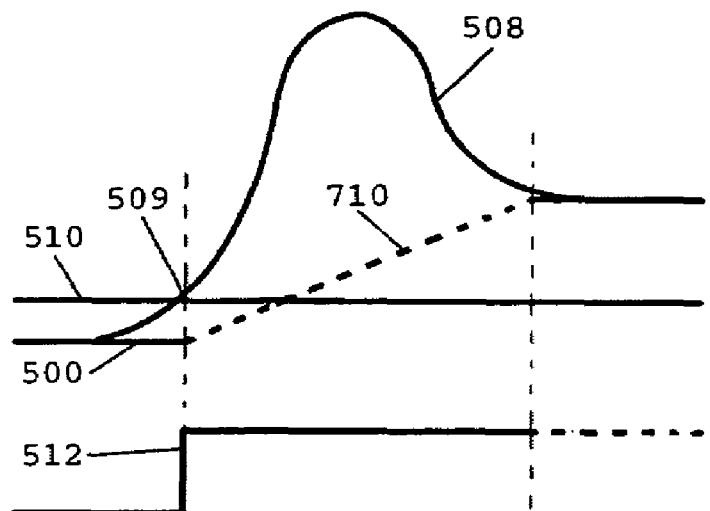
FIG. 7-F
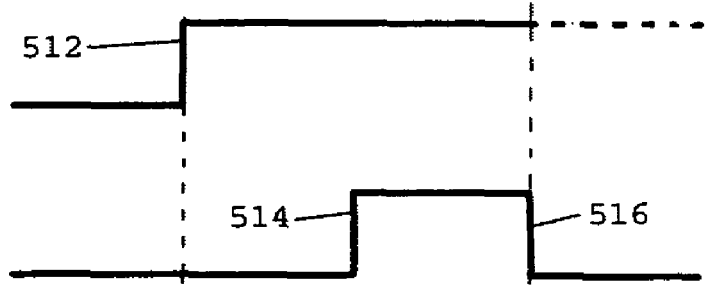
FIG. 7-G
FIG. 7-H
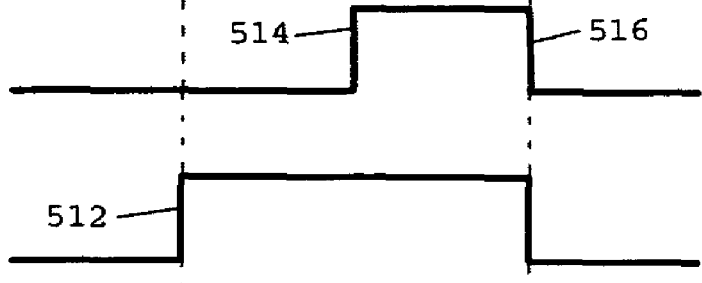
FIG. 7-I
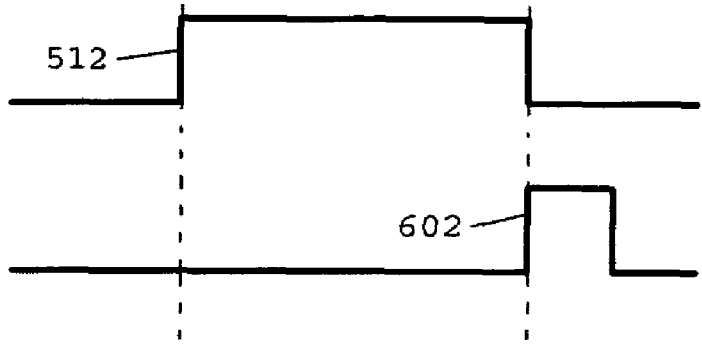
FIG. 7-J

METAL DETECTOR WITH RELIABLE IDENTIFICATION OF FERROUS AND NON-FERROUS METALS IN SOILS WITH VARYING MINERAL CONTENT

CROSS-REFERENCE TO RELATED APPLICATIONS

This application claims the benefit of U.S. provisional application No. 60/611,070, filed on Sep. 15, 2004, which is incorporated herein, by reference in its entirety.

BACKGROUND OF THE INVENTION

This invention relates to metal detectors, and specifically to detectors that discriminate between ferrous and non-ferrous metals.

Discriminating metal detectors are well known. More than 80 patents claim to have solved the problems inherent in such detectors, but the improvements in the art have been introduced in such small increments that a level of performance that satisfies the demands of the market place has not yet been attained.

Discrimination is said to be functional "if ground permits" or "if the signal is not too weak". Graphical representations of the discrimination capability show that it is operative to a target depth that amounts to less than a quarter of the maximal detection depth.

The difficulties encountered by the state-of-the-art detectors stem from the fact that the resistive and reactive components of the signal intercepted by the receiver coil are intermingled and the various methods used to separate them are very complex and the results obtained are not good enough to achieve reliable discrimination against ferrous metals.

Instead of attempting to analyze the complex target signals, the present invention separates them into their components at their very source, by using a unique coil-current wave form.

A partial separation of the received signals into in-phase and quadrature signals, has been achieved in prior art.

Karbowski, in U.S. Pat. No. 4,906,973 describes such a system. However, his system fails to differentiate between signals of different origins, the effect of which will be discussed below in further detail.

The above-cited patent senses the reactive component only when a target is present, as determined by the presence of a resistive signal—a feature in common with the present patent. The purpose for doing that is materially different in the present patent, however. Karbowski's purpose is to differentiate between a human body and a metallic object; in the present patent, the object is to differentiate between ferrous and nonferrous targets.

The purpose for initiating the reactive-component sensing when the resistive component is present, is that the reactive components originating in the background must be nulled out immediately prior to the sensing of reactive signals caused by the target. This must be accomplished dynamically, as the environment and the coil assembly alignment change. Such a dynamic alignment requires an electronic feedback loop. Karbowski describes only mechanical means for nulling the detector.

Other means for nulling or "balancing" a detector are also used in prior-art hand-held detectors. For example, a synchronous demodulator, with the signal gating pulse straddling the zero crossing point, as shown in FIG. 1, yields one output signal polarity for ferrous targets and the opposite polarity for non-ferrous targets. This is true, when the coil system has been balanced for a signal that contains both resistive and reactive components. In the balanced condition, discrimination between ferrous and non-ferrous targets is possible, however, presence of magnetic minerals in the ground often causes misidentification of a target. A change in the reactive component of the signal causes a phase shift, as shown in FIG. 2. The detector can not determine whether this is caused by a target, or a change in the soil.

Attempts to separate the target signal from the background signal have resulted in the design of detectors which use multiple operating frequencies and process the resulting signals with extremely complicated circuits. The drawbacks of such methods are obvious when one considers the problems of alignment, power consumption and drift of complex systems, under the temperature and humidity conditions that metal detectors are expected to endure.

The objective has been to make use of the fact that the ratios between the resistive and reactive components of the target signal vary with the nature of the target and the frequency used. Thus, it is theoretically possible to identify a target by comparing the received signal to memorized "signatures" of desirable and undesirable targets.

Owing to the fact that some undesirable objects like "hot rocks" present an infinite variety of signatures, this type of system represents only a partial solution to the problem. The fact that many signatures of desirable and undesirable targets overlap is another shortcoming of such a system.

To overcome the limitations of sine-wave systems, pulse-induction systems have been developed. In such systems, the target signal is sampled at a time when the primary field is absent, thus eliminating signals owing to mutual inductance between the receiver and transmitter coils. This expedient greatly reduces a detector's sensitivity to magnetic minerals in the soil, but it also eliminates the detector's ability to discriminate between ferrous and non-ferrous targets. Such "all-metal" detectors are used mostly in industrial applications, where any metal contamination must be detected and removed from a product.

A certain level of in-phase signal is present at nearly all times, owing to soil conductivity or the presence of minerals that exhibit magnetic viscosity or energy absorption and release effects.

This background signal must be eliminated so that it does not affect the threshold at which a target is detected.

The simplest method of prior art uses capacitive coupling between the demodulator and the level sensor, to eliminate the DC component of the signal.

Such detectors are known as "motion detectors". Capacitive coupling of the signal eliminates one problem but introduces a new one.

A transient, negative-going excursion of the signal, caused by a void or an inert rock in the ground produces a rebound, which results in a positive signal. A human ear may be able to learn to recognize the characteristic sound produced by this phenomenon, but a level sensor can not. An industrially usable detector must issue a non-ambiguous signal such as a logic pulse, to stop a conveyor belt or to operate automatic target processing machinery.

More sophisticated detectors use what is known as a "self-adjusting threshold", which periodically restores the background signal to zero. In some instruments, the rate at which this occurs is variable, to make it possible to strike a reasonable balance between instability and loss of sensitivity.

Owing to the possibility of cancelling out a target, this method is not usable in detectors monitoring a conveyor belt, or in other sensitive applications.

In the present invention, the background signal is eliminated by a method which is not subject to the above limitations.

The degree of mineralization of the ground may change during the very time the target signal is being acquired, thereby affecting the target identification process. This problem is not addressed in prior-art-detectors.

In the present invention, the background change is assessed by evaluating the background immediately before and after the target signal is acquired. By this means, the effect of the changing background is eliminated.

A similar problem arises when several targets are located in close proximity and one of them exhibits undesirable characteristics. In prior-art detectors, signals from the undesirable target cause all the targets to be misidentified.

The present invention comprises a means to detect the presence of multiple targets, lessening the probability of a good target being masked by an undesirable one.

Owing to the above-described problems with state-of-the-art metal detectors, there is a need for an improved detector, particularly for use in gold mines, recycling facilities, security applications, food processing and for land mine detection.

Even detectors used by hobbyists benefit from the ability to discriminate between worthless and valuable targets, without the need to interpret ambiguous visual and auditory cues.

The failure of prior-art technology to solve the problems associated with target identification can be largely attributed to the use of techniques which do not identify and counteract the various signals that are elicited when a magnetic flux pulse penetrates the ground and the signals generated owing to mutual inductance between the transmitter and receiver coils.

In contrast, the present invention detects the various signals engendered by the coil pulse and provides the means to nullify the ones that impair detector performance.

Theory

To facilitate the understanding of the operation of the present invention, the underlying physical principles are outlined below.

FIG. 3-A shows the shape of the coil current. In accordance with Faraday's Law of Electromagnetic Induction, a changing magnetic field produces a voltage which is proportional to the time-derivative of the magnetic field.

In the case of a linearly changing field, the induced voltage is a steady DC level, as shown by trace 312, in FIG. 3-B.

When such a voltage is generated in a conductive object, a current results. The magnitude of the current is initially zero, and it gradually attains a maximal value which is determined by the induced voltage and the resistance in the current path. This current is generally know as a Foucault current, or more popularly, as an eddy current.

The speed with which the current attains its maximal value depends on the ratio between the inductance and the resistance of the current path. This quantity has been given a the name "time constant", according to the formula:

$$T = L/R$$

where T is the time constant, L is the inductance and R is the resistance.

During the build-up phase, the eddy current follows an exponential path, which is defined by the equation:

$$I = I_{max} \times (1 - e^{(-t/T)})$$

where I is the current at time t, I.sub.max is the steady-state current after the build-up period, e is the base of the natural logarithm and T is the time constant of the target.

Such a changing current generates a magnetic field, referred to as a secondary magnetic field, in metal detector terminology.

The secondary magnetic field induces a voltage in the receiver coil of a metal detector, and owing to the fact that the time derivative of an exponential function is an exponential function, the resultant voltage has the same time constant as the eddy current, as shown by trace 324, in FIG. 3-C. Owing to its origin, this voltage is referred to as the "eddy-current voltage".

The eddy-current voltage changes according to the formula:

$$E = E_{0} \times e^{(-t/T)}$$

where E is the voltage at time t and E sub.0 is the initial voltage.

It is important to note here, that the eddy-current voltage approaches zero, asymptotically. Thus, if the current ramp in FIG. 3-A is long enough, the eddy-current voltage is substantially zero at the end of the ramp.

While the steady-state eddy current does not induce a voltage in the receiver coil, it continues to have an effect on the mutual inductance of the coil system.

In prior-art detectors, a gross reduction of the inductive coupling between the transmitter and receiver coils is usually accomplished by mechanical means, and any residual signal is removed by adding a compensating signal of the appropriate magnitude and polarity to the preamplifier input.

When an object having a higher magnetic permeability than air is brought into the vicinity of such a balanced coil system, the balance is upset, and a voltage is generated in the receiver coil. Such a voltage is termed "mutual-inductance voltage".

A steady current flowing in a conductive object near the coil system produces an analogous mutual-inductance voltage, but of the opposite polarity.

When a target having both magnetic and conductive properties is brought into the vicinity of the coil system, the signals produced are antagonistic, and the difference between them will be manifested.

During the build-up phase of the eddy current, the eddy-current signals and the mutual-inductance signals are subtracted algebraically. As the eddy-current signal decays, the mutual-inductance signal becomes predominant, as show by traces 408 or 410, in FIG. 4-C.

When a steady state is attained near the end of the current ramp, the residual signal represents the difference between the magnetic imbalance and the effect caused by a steady-state eddy current in the target.

It has been observed that in most targets that are both magnetic and conductive, the magnetic effect predominates, making it possible to determine the magnetic property of the target simply by noting the polarity of the mutual-inductance signal.

This condition is illustrated by trace 410, in FIG. 4-C.

In contrast, a non ferrous target generates signals that are additive during the eddy-current build-up period, as shown by trace 408, in FIG. 4-C After the build-up effects have subsided, the residual mutual-inductance signal has the opposite polarity of that caused by a ferrous target.

In ferrous targets that sustain large eddy currents, owing to a shape that represents a large area perpendicular to the magnetic flux from the transmitter coil, the sum of the mutual inductance signals may be of indeterminate polarity.

It is therefore advantageous to remove the signal component that represents the steady-state eddy current.

The signal present during the constant-current interval 304, in FIG. 3-A, is a measure of the steady-state current, and it can be sampled there, while the mutual-inductance signal is absent. Sampling this signal at interval 315, shown in FIG. 3-C, and subtracting the value from the sample at interval 328, will make the magnetic imbalance signal more prominent.

This technique will also eliminate another artifact which is termed the "dynamic imbalance signal".

While the coil system is in motion, relative to magnetic material in the vicinity, the changing mutual inductance between the transmitter and receiver coils will generate a transitory magnetic imbalance signal. Additionally, the realignment of the domains will generate a transitory resistive signal, owing to absorption or release of energy. These signals have essentially the same magnitude at the end of the current ramp and during the constant-current interval, and they can thus be substantially eliminated by the above-mentioned sampling and subtraction.

The signals caused by energy absorption and release can be significantly reduced in amplitude if the coil current is made unipolar, in contrast to the current practice of using bipolar coil excitation. Using a biphasic coil current, as shown in FIG. 4-D, has the advantage of using less energy for a given length of the current ramp, but at the cost of more interference by ground signals.

The choice between the unipolar and biphasic options depends on the application of the detector.

When energy consumption of the detector is of importance, as in battery-powered detectors, extending the current ramp long enough to allow transitory signals to decay to substantially zero, may be impractical.

There is an alternate method of determining the polarity of the of the mutual-inductance signal, however.

In FIG. 4-C, the eddy-current signals 408 and 340 should have the same time constant when calculated from the samples taken at intervals 326, 328 and 342 and 344, respectively. When the signal amplitudes are assigned the designations V1, V2, V3 and V4, in sequence, the time constants can be calculated according to the equation:

$$T1 = t/\log(V1/V2) \text{ and } T2 = t/(\log(V3/V4)$$

where T1 is the time constant during the ramp and T2 is the time constant after the coil pulse. The time difference between the sampling pulses=t, and log is the natural logarithm.

Assuming that there is no significant eddy-current carry-over from the ramp interval to the after-pulse interval, by making the constant-current interval 304 appropriately long, the two time constants should be essentially the same.

It will be found however, that the two time constants may differ significantly, and this can be attributed to the influence of the mutual-inductance signal.

The means to compute and compare the time constants of the signals intercepted by the receiver coil involves the following steps:

Microcontroller 811 directs gating circuit 808 in FIG. 8 to sample the received signals at gating intervals 326 and 328, shown in FIG. 4-C. An algorithm in the program of the microcontroller computes a first time constant T1 from the acquired values per the equation shown in paragraph The result is stored in the memory of the microcontroller. A second time constant T2 is derived in an analogous fashion from samples 342 and 344, in FIG. 4-C. T2 is then subtracted from T1. If the result of the subtraction is negative, the target is ferrous and if the result is positive, the target is non-ferrous. The actual polarity of the subtraction result depends on how the coils are wired, however, ferrous and non-ferrous targets always yield opposite polarities as a result of the above subtraction.

This determination of the ferrous or non-ferrous nature in unambiguous and it does not depend on stored signatures of targets nor does the method fail, when the time constant of the target signal is similar to the time constant of the background signal owing to mineralization of the soil.

Magnetite, or "black sand", in the parlance of prospectors, is often found in areas where gold is found. Having a higher specific gravity than the country rock, magnetite is concentrated in the same gravity traps that catch gold nuggets. This circumstance constitutes a major problem for state-of-the-art detectors, since it affects the balance of the coil system.

When only one target is present in the vicinity of the coil system, the demodulated envelopes of the signals of eddy-current origin and those of mutual-inductance origin are essentially synchronous, as shown by traces 508, 604 and 606, in FIGS. 6-A and 6-D. Trace 606 is the response to a ferrous target and trace 604, to a non-ferrous target.

Occasionally, more than one target is detected at the same time, causing state-of-the-art detectors to misidentify a non-ferrous target, when a ferrous target is also present.

This problem is eliminated when the signal envelopes of the eddy-current and mutual-inductance signals are compared with respect to shape and the point in time at which the signals peak.

As shown in FIG. 5-F, the zero-crossing points of the differentiated signals will differ, when two targets with differing magnetic characteristics are present. The rising edges of traces 514 and 520 define the points in time when the two signals reach their peak amplitudes. The difference in the times is used to define the length of "misalignment pulse" 522. When a preset limit of the length of pulse 522 is exceeded, that is taken as an indication of the presence of more than one target, and a ferrous indication, which might normally be issued, is disabled.

The above criterion for multiple-target detection is shown by way of example only. Other criteria may also be used to measure the tracking between the eddy-current and mutual-inductance signals by programming the appropriate algorithm into the microcontroller.

In light of what has been discussed hereinabove, and from what can be seen in FIGS. 3-A, B and C, it can be concluded that by using the appropriate coil energizing current waveform, the various signals intercepted by the receiver coil can be temporally separated. The amplitudes of the various signal components can be ascertained by sampling the signals at appropriate times.

Thus, the use of complicated and ineffective signal-processing means are obviated.

DEFINITIONS OF TERMS

To further facilitate the understanding of the present invention, terms whose definitions may be distinct from usage in prior art and terms that denote phenomena not described in prior art, are defined below:

The term "dynamic magnetic mutual inductance voltage" as used herein refers to a transient signal caused by a change in inductive balance, owing to the introduction of magnetic material into the vicinity of the coil system. The voltage is present only while the magnetic material is in motion relative to the coil system.

The term "dynamic resistive mutual inductance voltage" as used herein refers to a transient signal caused by a change in inductive balance, owing to the introduction of conductive material into the vicinity of the coil system. The voltage is present only while the conductive material is in motion relative to the coil system.

The term "eddy-current voltage" as used herein refers to the voltage induced in the receiver coil by the "secondary field", caused by eddy currents in a target.

The term "external interference" as used herein refers to voltages induced in the receiver coil by permanent magnets in motion relative to the coil or by external fields, caused by power lines, e.g.

The term "magnetic mutual-inductance voltage" as used herein refers to the voltage caused by a change in inductive coupling owing to introduction of magnetic material into the vicinity of a coil system.

The term "magnetic viscosity" as used herein refers to the delayed reaction of magnetic domains to an imposed field, causing a transient magnetic field that is shifted in phase, relative to the imposed field.

The term "primary field" as used herein refers to the magnetic field imposed on the target and its environment by the transmitter coil of the detector.

The term "ramp voltage" as used herein refers to the voltage induced in the receiver coil by the linearly changing ramp current in the transmitter coil.

The term "resistive mutual inductance voltage" as used herein refers to the voltage caused by a change in inductive coupling owing to the introduction of conductive material into the vicinity of a coil system.

The term "secondary field" as used herein refers to the field caused by eddy-currents in the target.

The term "signal envelope misalignment" as used herein refers to the lack of tracking between the envelopes of the demodulated eddy-current and mutual-inductance signals.

The term "target voltage" as used herein refers to the voltage generated in the target owing to the primary field.

The term "voltage-controlled current source" as used herein refers to an electronic circuit that converts an input voltage into an output current, with the identical wave-shape.

SUMMARY

The metal detector of the present invention uses a linear coil-current ramp to enable separation of the resistive and reactive components of the target signal.

The salient departure from the prior art resides in the method of resolving the signals intercepted by the receiver coil into components that are not comingled. In the prior art, various signal-processing methods are used to analyze the target signal. In the present invention, the signal components are separated temporally, by virtue of the coil-current waveform, obviating the need for complex means of signal processing.

This approach results in a detector that is simpler in design and better able to distinguish between ferrous and non-ferrous targets.

OBJECTS AND ADVANTAGES

It is an object of the present invention to provide a metal detector that reliably identifies ferrous and non-ferrous targets.

It is another object of the invention to provide a metal detector whose capability of distinguishing between ferrous and non-ferrous targets is unaffected by the medium surrounding the target or the distance at which the target is found It is another objective of the present invention to provide a detector whose activation threshold is not subject to variation owing to the influence of magnetic minerals surrounding the target.

It is yet another object of the present invention to provide a detector that does not misidentify a non-ferrous target as being ferrous, when it is located in close proximity to a ferrous target.

It is a further object of the present invention to provide a metal detector yielding a non-ambiguous output that can be interfaced with automatic target-processing machinery without human intervention.

It is another object of the invention to provide a metal detector having a single-turn transmitting coil which presents the shortest possible recovery time from a current transient, when critically damped.

It is another object of the present invention to provide a metal detector that will maintain its optimal performance characteristics without periodic readjustments of its circuitry.

The advantages of the present invention become obvious when comparing its simplicity with the complexity of prior-art detectors that purport to accomplish the same task. In the present invention, the distinction between ferrous and non-ferrous targets is made by a simple determination of the polarity of a signal and not by a complicated comparison of reactive and resistive components of signals at multiple frequencies.

Further objects and advantages will become apparent from a consideration of the drawings and the description below.

Figure 1:
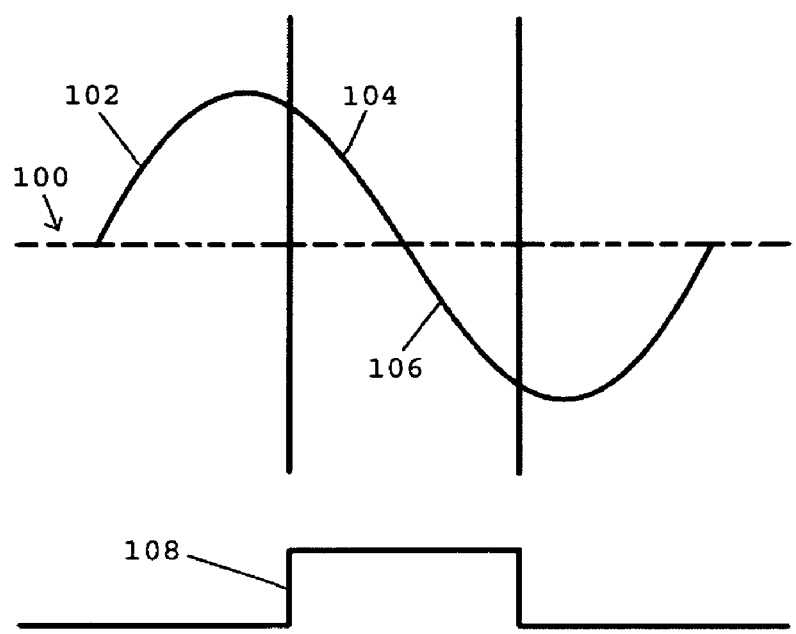
FIG. 1 shows a prior-art method of "ground balancing" a metal detector.

When the detector is ground-balanced, the signals bounded by base line 100 and the segments 104 and 106, respectively, are equal in magnitude and opposite in polarity, resulting in zero output from the demodulator.

The above condition is reached by varying the signal amplitude by raising and lowering the coil assembly above the ground, while adjusting the position of sampling gate 108, until no change in output results.

FIG. 2 shows that an output results in the above prior-art circuit, when the phase of the received signal is shifted. A phase shift signifies that the correlation between the reactive and resistive components has changed. Ferrous targets shift the phase in one direction and non-ferrous targets in the opposite direction, provided that the gate was initially nulled with a signal containing both resistive and reactive components. A shift in the non-ferrous direction can also be caused by a ferrous target that exhibits magnetic viscosity.

FIG. 3-A shows the coil-current waveform in the present invention. Since the magnetic field generated by a coil is directly proportional to the current through it, this is also representative of the waveform of the magnetic flux imposed on the target and its environment.

FIG. 3-B shows the voltages imposed on the target and the resulting eddy currents. The target voltages are proportional to the derivative of the magnetic flux imposed on the target.

FIG. 3-C shows the voltage induced in the receiver coil owing to the eddy current in the target.

FIG. 4-A shows the coil current, as a reference for mutual inductance signals and eddy-current signals, shown in FIG. 4-B and FIG. 4-C, respectively.

FIG. 4-B shows the voltages that arise when the mutual inductance between the transmitter and receiver coils is changed. Targets having a predominantly reactive characteristic generate voltages of one polarity and targets having a predominantly resistive characteristic generate voltages of the opposite polarity.

FIG. 4-C shows the simultaneous presence of voltages from inductive imbalance and from eddy currents in the target. It should be noted that when the transitory eddy-current signals, shown by traces 408 and 410, have decayed to substantially zero, the remaining signal represents an inductive imbalance of the coil system.

FIG. 4-D shows an alternate coil-current wave shape of the present invention. This waveform doubles the length of the linear current ramp for a given power dissipation, but the biphasic nature of the current increases the magnitude of the background signal owing to energy absorption by causing the magnetic dipoles to traverse more of their hysteresis curve.

FIG. 4-E shows the sampling of the preamplifier output between the coil pulses to eliminate DC offsets and signals induced in the receiver coil by permanently magnetized minerals. This refers to unipolar coil energizing pulses.

FIG. 4-F shows a second alternative coil current waveform of the present invention.

FIG. 5-A shows the demodulated target signal, combined with the background signal, in reference to the base line. As most soils contain minerals that generate a resistive signal that is electrically indistinguishable from a target signal, the relatively constant background signal must be removed from the transitory target signal.

FIG. 5-B shows the result of differentiating the combined background and target signals.

FIG. 5-C shows the result obtained when the differentiated signal is re-integrated. It should be noted that the DC component of the combined signal has been removed, bringing the signal below the detection threshold 510, until the target signal exceeds it at point 509.

FIG. 5-D shows the pulse generated by the level sensor, when the signal first exceeds and then falls below the detection threshold.

FIG. 5-E shows the pulse generated when the differentiated signal, as shown in FIG. 5-B, crosses zero, while the target signal is above the detection threshold. This pulse, termed "center pulse", indicates that the center of the target signal envelope has been passed. Such an indication is useful in hand-held detectors for "pin-pointing" purposes and for marking a conveyor belt to indicate the position of a target buried in the load.

FIG. 5-F shows the differentiated waveforms of the eddy-current and mutual inductance signals respectively, as traces 504 and 516. The zero crossing points of the above signals coincide with the rising edges of the center pulses 514 and 520. The misalignment pulse 522 is initiated and terminated by the center pulses, and the length of pulse 522 is a measure of the misalignment between the eddy-current and mutual inductance signals.

FIGS. 6-A, 6-B, 6-C and 6-D show the relationships between the signals sampled during the current ramp and after the abrupt return of the coil current to zero. When target signal 508 exceeds the detection threshold 510, pulse 512 in FIG. 6-B, is generated, to indicate the time interval during which the threshold is exceeded. During that interval, the negative feedback, which normally nulls the mutual inductance of the coil assembly, is disabled. As a consequence, the signal sampled at the end of the current ramp will indicate in which direction the coil system is influenced by the target. Signal 604 in FIG. 6-D represents a non-ferrous target and signal 606 represents a ferrous target. The actual polarities of the signals are arbitrary, since they depend on how the coils are wired. The significant fact is that the signals are of opposite polarities for ferrous and non-ferrous targets.

FIG. 6-C shows the sampling pulse generated after the target has passed the coil system.

FIGS. 7-A through 7-J show the signal relationships when the background signal varies significantly while the target moves relative to the coil system. Sampling pulse 602 in FIG. 7-C is generated immediately after the target signal falls below the detection threshold. If the background signal 02 in FIG. 7-D has changed while the target was being detected, the average change is subtracted from the mutual inductance signal 606, so that the influence of the background is removed. Trace 704 in FIG. 7-E shows the combined background and mutual inductance signal after integration Trace 708 shows the mutual inductance signal, after the changing background signal has been subtracted.

FIG. 7-F shows a target signal and a changing resistive background signal, as sampled after the coil pulse. It can be seen that owing to the increasing background signal, the combined signal does not fall below the detection threshold after the target is passed. The output of the level sensor is thus not able to determine when the target has been passed, as shown in FIG. 7-G FIG. 7-H shows the center pulse, triggered at the peak of the target signal, as shown in FIG. 5-E.

The length of the center pulse is determined by the distance between the triggering point 509 and the peak of the target voltage. The falling edge 516 of the center pulse is used to terminate pulse 512 in FIG. 7-I and to trigger the post-target sampling pulse in FIG. 7-J. The premise is that the relative speed between the coil and the target remains essentially constant during the sampling interval. Thus, the target signal envelope is symmetrical around the peak signal.

Figure 8:
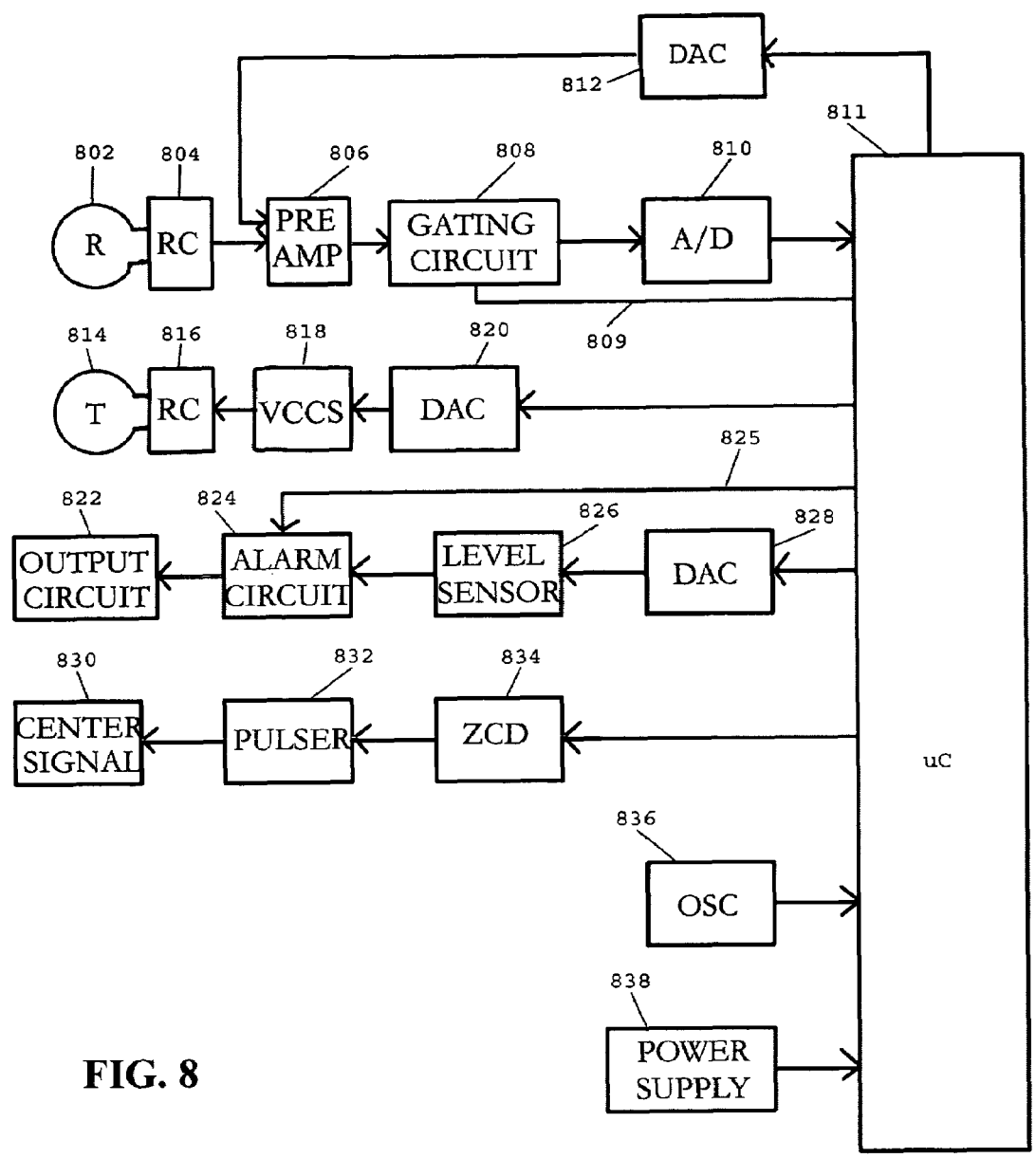

FIG. 8 shows a block diagram of the present invention. The blocks contain functional units which are well known to those skilled in the art and require no further description. There is one possible exception to the above statement, and to remove the need for any undue experimentation, a detailed circuit diagram is given of the voltage-controlled current source, below.

Figure 9:
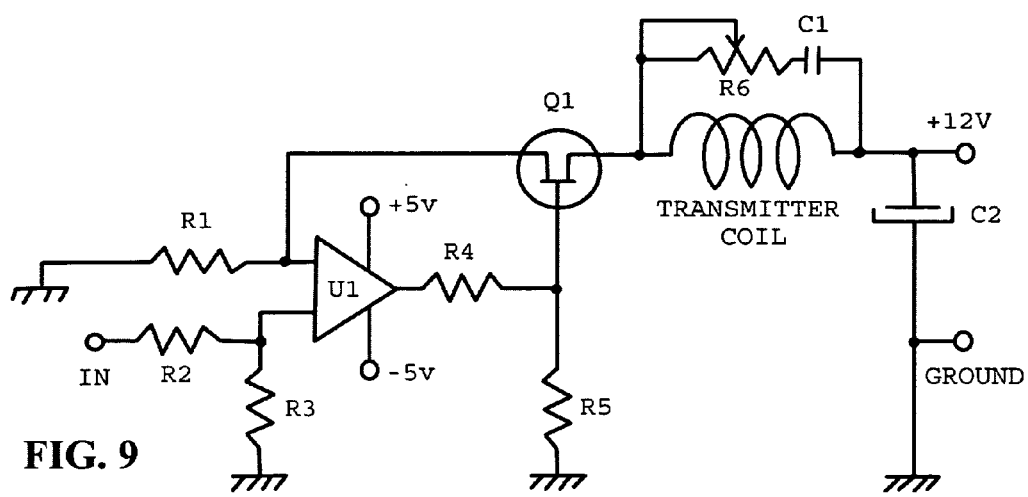

FIG. 9 shows a circuit diagram of the voltage-controlled current source. An input voltage generated by a digital-to-analog converter is transformed by this circuit into a current with the same wave shape as the voltage. Voltage-controlled current sources are well known in the art. Yen, in U.S. Pat. No. 7,417,425, describes such a circuit. The circuit shown in FIG. 9 differs from the standard circuits only in its capability of handling higher currents.

Figure 10:
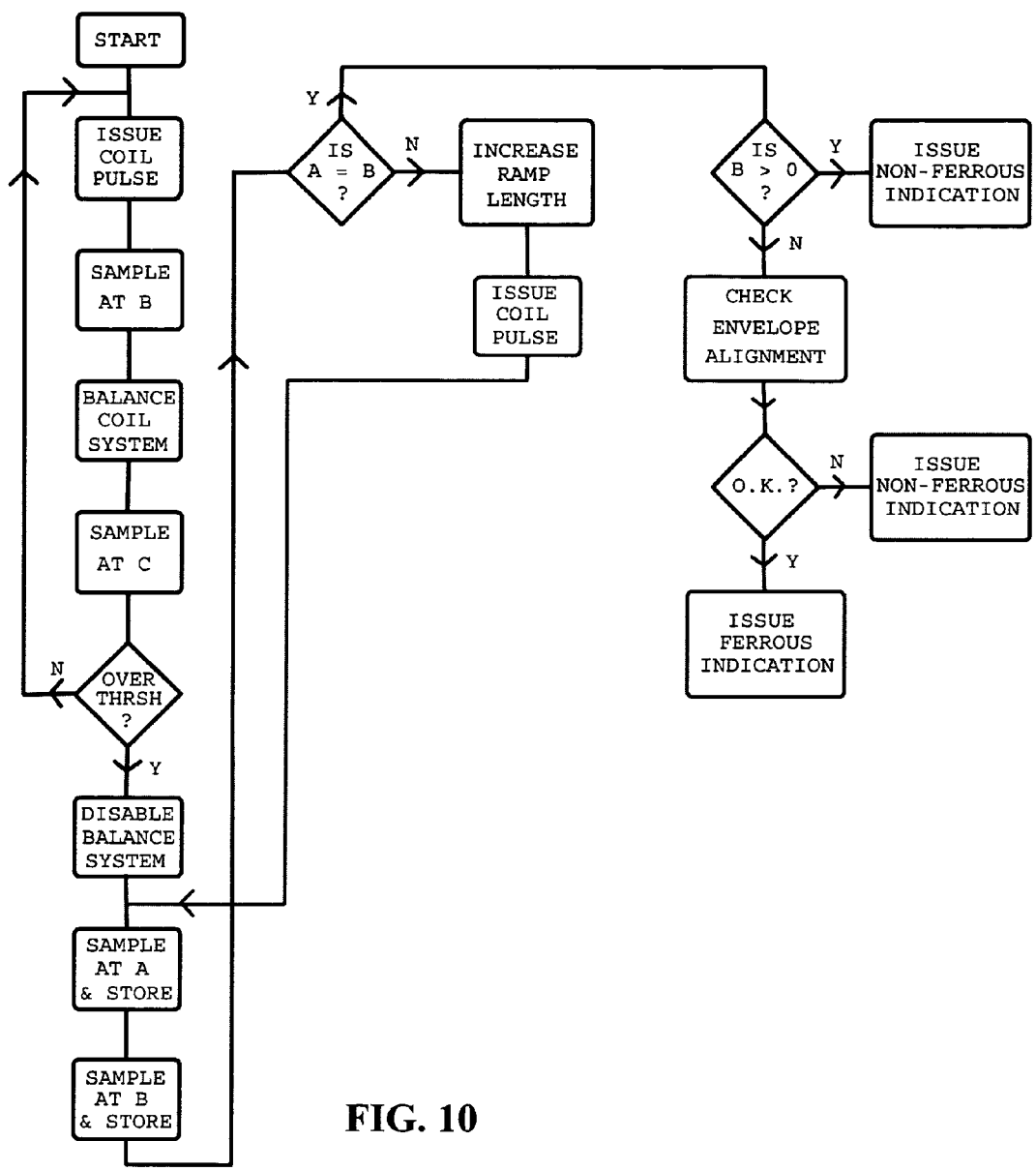

FIG. 10 shows a flow chart of the operation of the preferred embodiment of the invention.

Figure 11:
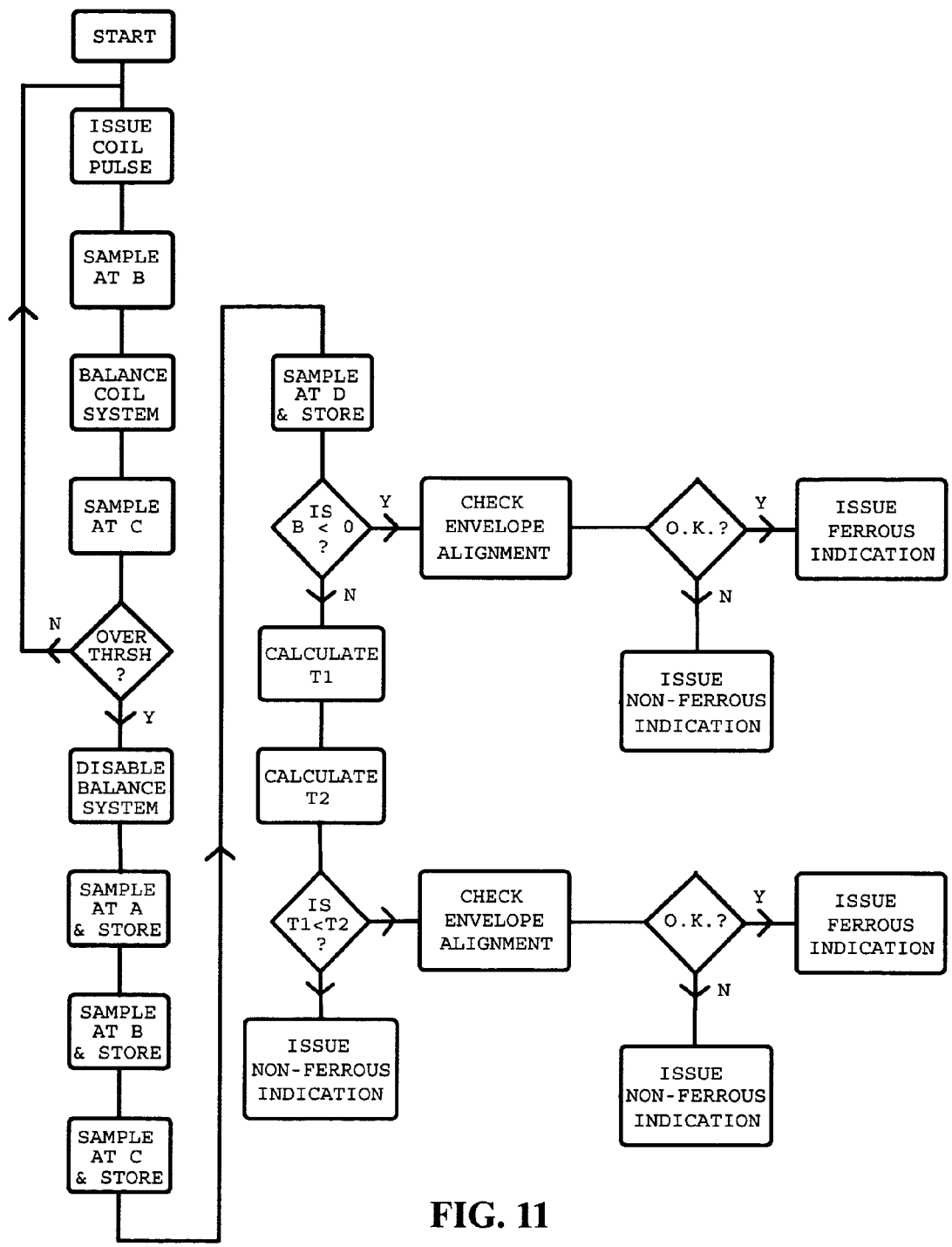

FIG. 11 shows a flow chart of the operation of an alternate embodiment of the invention.

Figure 12:
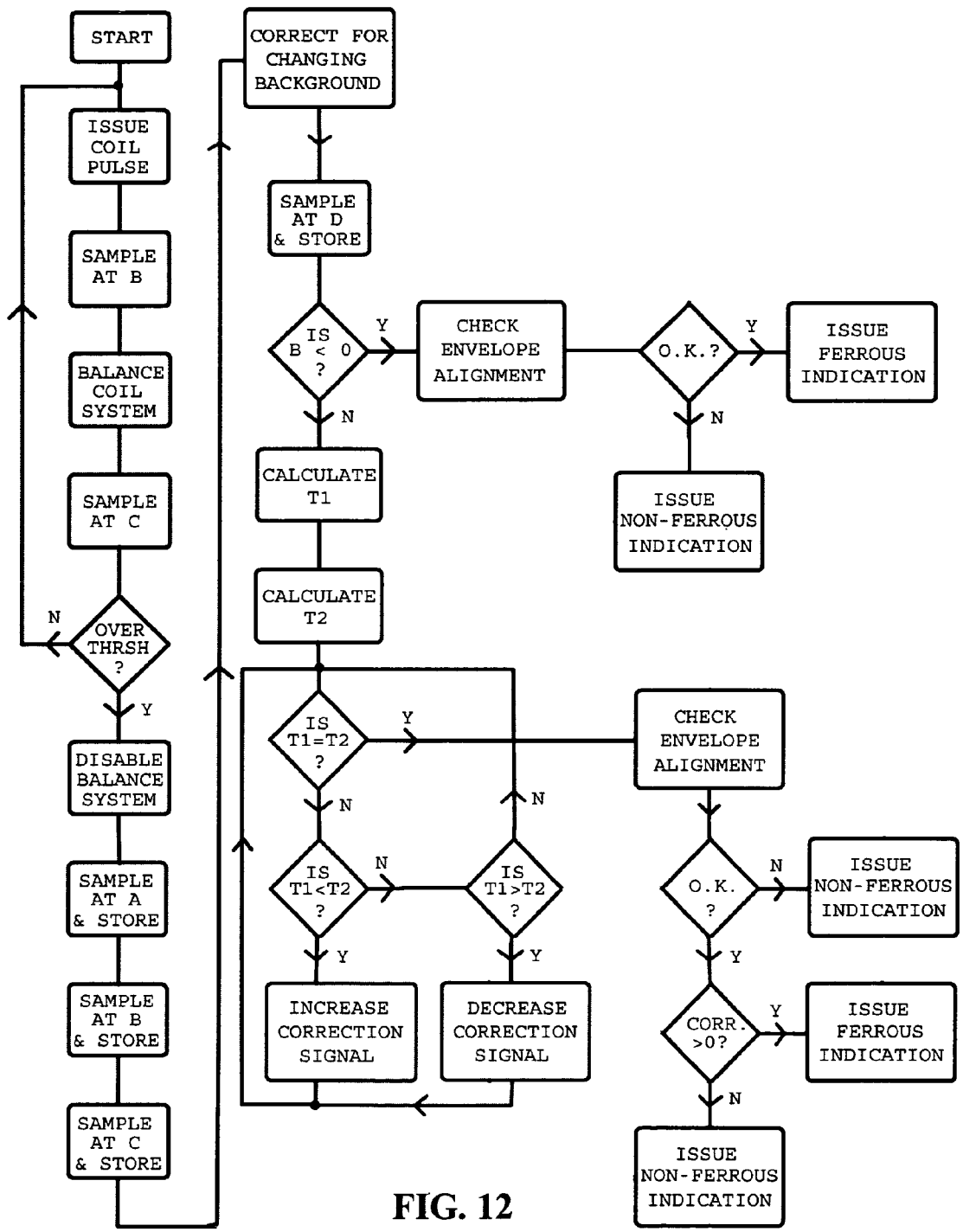

FIG. 12 shows the flow chart of an additional alternate embodiment of the invention.

REFERENCE NUMERALS USED IN THE DRAWINGS

100 Zero baseline of amplifier. Prior art
102 Background signal. Prior art
104 Positive segment of background signal. Prior art.
106 Negative segment of background signal. Prior art.

108 Signal sampling pulse. Prior art.
300 Coil current waveform.
302 Linear current ramp.
304 Constant current interval.
306 Abruptly decreasing current interval.
308 Zero current interval.
310 Voltages imposed on the target and the resulting eddy currents.
312 Voltage generated in target during linear current ramp.
314 Eddy current generated in target during current ramp.
316 Decay of eddy current during constant current interval.
318 Eddy current generated during rapid decrease of coil current.
320 Decaying eddy current in target after the end of coil pulse.
322 Voltages induced in the receiver coil by eddy currents in target.
324 Receiver coil voltage during current ramp.
326 First gating interval.
328 Second gating interval.
340 Eddy-current voltage, generated by eddy currents in target.
342 Third gating interval.
344 Fourth gating interval.
402 Voltages generated in receiver coil owing to inductive coupling to transmitter coil.
404 Resistive mutual inductance voltage.
406 Magnetic mutual inductance voltage.
408 Eddy current voltage combined with positive mutual inductance voltage.
410 Eddy current voltage combined with negative mutual inductance voltage.
412 Base line of biphasic coil current pulse.
414 Linear current ramp of biphasic coil current pulse.
420 Signal sampling interval during constant current segment of coil pulse.
422 Signal sampling interval between the coil pulses
424 Alternative coil current waveform.
426 First target signal gating interval,
428 Second target signal gating interval.
430 Alternate mutual inductance signal gating interval.
432 Eddy current imbalance compensation signal gating interval.
440 Mutual inductance and eddy-current-induced voltages with alternate coil current waveform.
500 Zero reference for demodulated target signal.
502 Combined background and target signals, sampled after the coil pulse.
504 Combined target and background signals, after differentiation.
506 Zero-crossing point of differentiated target and background signals.
508 Re-integrated target signal.
509 Triggering point of level sensor.
510 Detection threshold of level sensor.
512 Output pulse of level sensor.
514 Output from pulser circuit, indicating the center of the signal sampled after the coil pulse.
516 Differentiated mutual inductance signal.
518 Zero crossing point of differentiated mutual inductance signal.
520 Pulse indicating the center of the mutual inductance signal.
522 Misalignment indication pulse.
602 Signal sampling pulse after passage of target.
604 Demodulated mutual inductance signal of first polarity, owing to presence of a target.
606 Demodulated mutual inductance signal of second polarity, owing to presence of a target.
702 Mutual inductance signal during ramp, owing to changing ground mineralization.
704 Target and background signals owing to mutual inductance change, after integration.
706 Zero base line.
708 Mutual inductance signal of target, after correction for changing background.
710 Changing resistive background signal.
802 The receiver coil.
804 Critical damping network for receiver coil.
806 Preamplifier.
808 Signal gating circuit.
809 Gating pulse connection.
810 Analog-to-digital converter.
811 Microcontroller.
812 Digital-to-analog converter.
814 Transmitter coil.
816 Critical damping network for transmitter coil.
818 Voltage-controlled current source.
820 Digital-to-analog converter for coil pulse.
822 Output circuit.
824 Alarm circuit.
826 Level sensor for target signal.
828 Digital-to-analog converter for processed target signal.
830 Center signal indicator.
832 Pulser for generating target center pulse.
834 Zero crossing detector.
836 Oscillator for microcontroller.
838 Power supply.

Parts List for FIG. 9

R1=0.1 OHMS; R2=100 OHMS; R3=1 KILOOHM; R4=100 OHMS; R5=1 KILOOHM R6=100 OHMS

C1=0.001 uF; C2=470 uF

U1=LM6364; Q1=IRF520

DESCRIPTION OF THE PREFERRED EMBODIMENT

FIG. 8 shows a block diagram of the preferred embodiment of the invention. Receiver coil 802 is connected to the input of preamplifier 806 which feeds an amplified signal to the gating circuit 808. The output of the gating circuit is connected to analog-to-digital converter 810, which interfaces with microcontroller 811. The gating pulses for circuit 808 are generated by the processor 811 and delivered via connection 809.

R-C network 804 provides critical damping of the receiver coil, which is implemented with only as many turns as are sufficient to raise the signal amplitude above the noise level of the input stage. This approach increases the self-resonant frequency of the coil, making damping easier.

Processor 811 feeds a digitally stored waveform to digital-to-analog converter 820 and the corresponding analog signal is fed to voltage-controlled current source 818, which energizes transmitter coil 814. The shape of the current wave form is shown in FIG. 3-A.

Transmitter coil 814 in FIG. 8 is preferably a one-turn coil, wound with heavy-gauge wire. One Ampere flowing through a ten-turn coil produces the same flux as ten Amperes flowing through a one-turn coil, but the latter has one one-hundredth the inductance. The inductance of the coil resonates with its self capacitance and it is desirable to keep the oscillating frequency as high as possible. The abrupt change in coil-current amplitude at the end of the coil pulse shocks the coil into oscillations and the target signal can not be sampled until the oscillations have ceased The transmitter coil is terminated by R-C network 816, to minimize the oscillations.

The above approach permits the positioning of gating interval 342 very close to the end of the coil pulse, making it possible to capture signals with short time constants, associated with gold veins and nuggets with irregular shapes. The circuit elements involved in energizing the coil are collectively called the "coil-excitation means".

Processor 811 is also connected to preamplifier 806 via digital-to-analog converter 812 in a negative feedback loop, implemented by a program in the processor. This feedback loop is used to neutralize the mutual inductance signals 404 and 406, shown in FIG. 4-B.

The signal intercepted by receiver coil 802, amplified by preamp 806 and sampled by gating circuit 808, is converted into digital form by A/D converter 810. The above functional blocks constitute the demodulating means. Inside microcontroller 811 the signal exists in digital form and it is differentiated by an algorithm in the program. The signal is then re-integrated by another algorithm and the result is fed to DAC 828, which converts the signal back into an analog voltage.

Trace 502 in FIG. 5-A shows the demodulated signal before differentiation and trace 504 shows it after differentiation.

The result of re-integration is shown by trace 508, in FIG. 5-C. It can be seen that the DC component of the signal, shown as the difference between baseline 500 and the end of trace 502 in FIG. 5-A, has been removed. This effect is analogous to a mathematical operation of integration, where a constant C must be added to the integral to reconstitute a differentiated function. In this case, no constant is added, and thus, the DC component is removed from the signal.

Removal of the DC component of the signal prevents the background signal generated by magnetic or conductive minerals in the soil from affecting the detection threshold of level sensor 826. When the signal amplitude exceeds threshold 510 at point 509, in FIG. 5-C, pulse 512 is issued, while the signal level remains above the threshold.

Pulse 512 deactivates the negative feedback loop.

As a consequence, the mutual inductance voltage is allowed to vary while the coil system is passing by the target and the polarity of the resulting voltage indicates whether the target is ferrous or non-ferrous. Based on an election in the program of the microcontroller, when a signal polarity corresponding to a ferrous target is detected, inhibit pulse 512 is sent to alarm circuit 824, via connection 825, so that ferrous targets do not activate the alarm circuit.

The above action of the described functional blocks constitutes the means to provide an unambiguous indication of the nature of the target, based on the polarity of the signal component caused by inductive coupling between the transmitter and receiver coils.

When an alarm is issued, output circuit 822 converts it to a usable form, which may be an auditory or visual signal or a machine-readable pulse. The circuit elements that sample, process and convert the signals to usable form are collectively termed output means.

Processor 811 also feeds a differentiated signal waveform to zero crossing detector 834 which triggers pulser circuit 832. Pulse 514 is issued, when the peak of the target signal is passed at the zero-crossing point 506. This relationship is shown in FIGS. 5-B and 5-E.

Pulser circuit 832 activates center signal circuit 830 which issues an indicium which can be used for "pin-pointing" the location of the target in portable applications, or marking the conveyor belt in fixed installations.

Some of the functional blocks shown as discrete analog functions may also be implemented by digital logic in the program running in processor 811 and alternatively, the whole circuitry may be implemented using discrete components, without using a processor. Thus, the diagram is to be interpreted as an example only and not as a limitation of the scope of the invention.

DESCRIPTION OF THE OPERATION OF THE PREFERRED EMBODIMENT

The operation of the metal detector will be explained using FIGS. 3, 4 and 8 as a reference. Microcontroller 811 sends a stream of digital data to DAC 820 which converts it into a periodically occurring voltage waveform, shown as trace 300 in FIG. 3-A. The voltage waveform is converted into a current with the same wave-shape and the current circulates in transmitter coil 814. The magnetic flux generated by the transmitter coil is imposed on the area to be searched by the detector.

The flux engenders three categories of signal receiver coil 802. In the first category, the mutual inductance between the transmitter and receiver coils gives rise to a signal that is proportional to the rate of change of the flux. Part of the flux waveform consists of a linear ramp and since the rate of change for such a ramp is constant, the resultant voltage is a DC pulse, shown as trace 404 or trace 406, in FIG. 4-B. The polarity of the pulse is arbitrary, since it depends only on the winding direction of the receiver coil. Signals intercepted by receiver coil 802 are amplified in preamp 806 and sampled at predetermined intervals by gating circuit 808, as directed by microcontroller 811. Gating interval 328, shown in FIG. 4-C is used to sense the amplitude and polarity of this mutual inductance voltage. The above voltage changes when a conductive or magnetic object is brought into the vicinity of the coils, but to make use of the information conveyed by the change, the voltage must be reduced to zero, when no such object is present. The zeroing function is performed by the compensating means which consists of a negative feedback loop, maintained by microcontroller 811.

The voltage sampled at gating interval 328 is digitized by A/D converter 810 and its polarity is inverted by a routine in the program of microcontroller 811. The magnitude of the signal is also modified so that when it is fed back to the summing junction of preamp 806, the residual signal at interval 328 is essentially zero.

A second category of signals is generated when the search head of the detector, containing the transmitter and receiver coils, is brought into the vicinity of the ground. Many soils contain conductive and magnetic minerals which interact with the field from the transmitter coil and produce signals which are sensed by the receiver coil. When the minerals are dispersed evenly in the ground, the background signal is essentially a DC voltage. In contrast, a signal from a target changes relatively rapidly when the search coil is swept over it. Signals associated with the ground are sensed during gating interval 342, in FIG. 3-C. The sampled voltages are amplified by preamp 806, sampled by gating circuit 808 as directed by the microcontroller 811, and converted into digital form by A/D converter 810. A routine in the program of the microcontroller differentiates the signal and re-integrates it. The effect of this operation is that the DC component of the signal is removed.

There are other background signals generated by mineral specimens termed "hot rocks" whose signal is not removed by the above stratagem, since their signal changes relatively rapidly and results in a non-zero differential. These specimens may generate signals having a time constant that may be similar to the time constants of desirable targets, such as gold nuggets. As a consequence, these objects must be discriminated against, using the method that is used to discriminate against metallic ferrous targets.

A third category of signals is generated in metallic targets brought into the vicinity of the search head. The linear flux ramp imposed on a target induces a voltage in it, shown as trace 312 in FIG. 3-B. The voltage generates a current which is shown by trace 314, in FIG. 3-B. The exponential build-up of the current follows the equation shown above. The changing eddy current in the target produces a secondary magnetic field, which induces a voltage in the receiver coil, shown by trace 324, in FIG. 3-C.

The signal sampled during interval 342 in FIG. 3-C is processed by an algorithm in the program of microcontroller 811 and after differentiation it has the wave-form show by trace 504 in FIG. 5-B. Re-integration by another algorithm in the program produces wave-form 508, in FIG. 5-C. The digital signal is processed by DAC 828, and the analog voltage is fed to level sensor 826. When the amplitude of the voltage exceeds the detection threshold 510 of the level sensor, an output signal is generated, shown by trace 512,*m* in FIG. 5-D. The presence of this pulse signifies that a target is present in the vicinity of the coil system, but it gives no indication of the nature of the target. Hot rocks, ferrous and non-ferrous targets yield similar signals. Rock specimens exhibiting the phenomenon of "magnetic viscosity" may produce signals that are indistinguishable from those generated by metallic targets. Thus, sampling the signals at interval 342 does not yield enough information to make it possible to distinguish between valuable non-ferrous targets and undesirable mineral specimens.

The information necessary to distinguish between ferrous and non-ferrous targets is available during gating interval 328, in FIG. 3-C. The mutual inductance voltage at this interval is maintained near zero by the compensating means, as described in the above paragraph. To assess what influence a target has on the mutual inductance voltage, the compensating means is disabled when a target is detected. While pulse 512 is in the high state, as shown by trace 512 in FIG. 6-B, the negative feedback loop is inhibited. This constitutes the means to deactivate the compensating means, to allow the presence of a target to influence the mutual inductance signal, while the signal sampled after the coil pulse, shown by trace 508 in FIG. 6-A exceeds threshold 510 of level sensor 826. The signal sampled during gating interval 328 is processed by the microcontroller just like the signal retrieved from gating interval 342. The resulting wave form is shown by trace 604 or 606, in FIG. 6-D. With the negative feedback loop disabled, the target causes the mutual inductance signal to yield either a positive or negative voltage, depending on whether the target is ferrous or non-ferrous.

When the duration of current ramp 302 is long enough to allow eddy current voltages from targets of interest to decay to essentially zero, the polarity of the voltage sampled at interval 328 provides an unambiguous indication of the ferrous or non-ferrous nature of the target. Thus, both hot rocks and metallic ferrous targets can be distinguished from desirable non-ferrous targets. When the time constant of a target is so long that its eddy current voltage has not decayed sufficiently at the end of the current ramp, an alternate method of determining the polarity of the mutual-inductance voltage can be employed.

If it is desirable to detect targets with very long time constants, extending the duration of the current ramp long enough to allow the eddy-current voltages to decay to essentially zero, may lead to high current consumption by the detector. This would be a disadvantage for battery-powered detectors. An alternate method can be used to determine the nature of targets with long time constants.

Two consecutive voltage samples are taken after the coil pulse as shown by intervals 342 and 344 in FIG. 3-C, and the time constant of the signal is computed by an algorithm in the program of microcontroller 811. When a time constant is computed using voltages sampled during intervals 326 and 328, the result will be different from the previous computation. This is caused by the addition of a constant voltage to both samples. When the added voltage is negative, the computed time constant is shorter than the true value, and when the added voltage is positive, the computed value will be longer than the true value, computed by using samples 342, and 344. Thus, when using the means to compare the two time constants by subtracting T2 from T1 in the program of the microcontroller, a negative result indicates the presence of an undesirable target, and this result is fed to alarm circuit 824 via connection 825, the output circuit is inhibited from functioning, yielding an output only when the comparison yields a positive result, which corresponds to a non-ferrous target To prevent the amplifier from being over-driven to a point where the recovery time is invoked, a compensating pulse is injected into the amplifier input during the rapidly changing current phase.

The correct amplitude and polarity for this pulse is derived from the balancing signal required for nulling in the negative feedback loop during the current ramp. Thus, the compensating pulse is dynamically adjusted, as the ground characteristics change.

Using all of the described techniques, gating pulse delay 317, in FIG. 3-C, can be reduced to a few tens of nanoseconds. This is in sharp contrast to the delays of tens of microseconds described in prior art. The ability to sample the target signal close to the trailing edge of the coil pulse makes it possible to detect what have been termed "invisible gold nuggets", in prior art.

The linear current ramp 302 in FIG. 3-A induces a constant-voltage pulse 312, shown in FIG. 3-B. It can be seen that the eddy current 314 in FIG. 3-B will assume a steady state if the ramp is significantly longer that the time constant of the target.

FIG. 3-C shows the induced voltages as a result of the eddy currents circulating in the target. It can be seen that when the eddy currents reach a steady state, the induced voltage is essentially zero.

The signal sampling intervals 326, 328, 342 and 344 of FIG. 3-C, used by gating circuit 808 in FIG. 8 are generated in the software of processor 811 and sent to the gating circuit via connection 809.

As pointed out above, toward the end of current ramp 302, in FIG. 3-A, the eddy current signal has decayed to substantially zero and thus, any signal present during gating interval 328, in FIG. 3-C, is caused by mutual inductance between the transmitter and receiver coils.

If it is desirable to detect targets with very long time constants, extending the duration of the current ramp long enough to allow the eddy-current voltages to decay to essentially zero, may lead to high current consumption by the detector. This would be a disadvantage for battery-powered detectors. An alternate method can be used to determine the nature of targets with long time constants.

Two consecutive voltage samples are taken after the coil pulse as shown by intervals 342 and 344 in FIG. 3-C, and the time constant of the signal is computed by an algorithm in the program of microcontroller 811. When a time constant is computed using voltages sampled during intervals 326 and 328, the result will be different from the previous computation. This is caused by the addition of a constant voltage to both samples. The constant voltage is the mutual inductance voltage, caused by the target. When the added voltage is negative, the computed time constant is shorter than the true value, obtained from samples 342 and 344, and when the added voltage is positive, the computed value is longer than the true value. Thus, when using the means to compare the two time constants by subtracting T2 from T1 in the program of the microcontroller, a negative result indicates the presence of an undesirable target, and this result is fed to alarm circuit 824 via connection 825, the output circuit is inhibited from functioning, yielding an output only when the comparison yields a positive result, which corresponds to a non-ferrous target. Since no interpretation of the output signal is required, the above provides an unambiguous indication of the ferrous or non-ferrous nature of the target.

A more detailed description of the functional blocks is given below.

For maximal detection efficiency, the transmitter and receiver coils must be mounted in a concentric orientation. Inevitably, this results in inductive coupling between the coils. Voltage waveform 312 in FIG. 3-B is also representative of the voltage induced in the receiver coil owing to mutual inductance between the coils. However, since this voltage is a simple DC level, it can be conveniently nulled out by a signal of the opposite polarity injected into he summing junction of preamplifier 806 via digital-to-analog converter 812.

A negative feedback loop implemented in the software of processor 811 can thus keep the mutual inductance signal nulled out indefinitely, even when the mutual inductance between the coils changes, owing to mechanical movement between the coils or owing to introduction of magnetic materials into the vicinity of the coils. This can be done because the reactive signal is not used for detection purposes.

The reactive signal is only used after a target has been detected, and then only to determine the nature of the target.

The abrupt transition 306 of the coil current, shown if FIG. 3-A, generates voltage pulse 317 in the target, as a result of which, eddy current 318 is generated in it. As soon as the amplitude of the corresponding eddy-current signal 340, as shown in FIG. 3-C, exceeds a predetermined amplitude, when sampled during gating interval 342 and processed by level sensor 826 in FIG. 8, the negative feedback loop implemented by processor 811 is suspended. Thus, when the target continues to pass by the coil system, it will influence the mutual inductance of the coil system and generate a signal, as shown in FIG. 4-B. The signal will have polarity 404 or 406, depending on whether the target is ferrous or non-ferrous.

This mutual inductance signal will combine with the eddy current signals from the target as shown by traces 408 and 410 in FIG. 4-C.

It can be seen, that to assess the magnitude and polarity of the mutual-inductance signal, one must wait until the eddy current signal has decayed to substantially zero. Before sampling interval 328, in FIG. 4-C, the mutual-inductance and eddy-current signals either add or subtract and can not be effectively separated. Such separation is essential for accurate target identification.

In FIG. 4-C, points closer to the beginning of the waveform correspond to higher frequencies in a sine-wave systems and points further along on the time axis correspond to lower frequencies. Owing to the fact that the eddy-current signals which originate in the target decay exponentially, whereas the mutual-inductance signals do not, signal separation becomes greater at lower frequencies. The theoretical limit is 0 Hz, which is what is represented by the linear current ramp, producing DC pulses 404 and 406, as shown in FIG. 4-B.

The permeability of magnetic targets increases the mutual inductance between the transmitter and receiver coils whereas steady-state eddy currents decrease it. It is the difference between the two effects that remains when the build-up of the eddy currents in the target and the environment has been completed.

It has been found that in most ferrous objects, the magnetic effect predominates, but in some mildly magnetic alloys or ferrous targets that present a large surface area to the coil flux, the eddy-current signal may override the magnetic effect. To eliminate the possibility of misidentification of such targets, the eddy-current signal component of the mutual-inductance signal is cancelled by sampling the eddy-current signal immediately after the end of the ramp and by subtracting this signal from the composite mutual-inductance signal.

Hot rocks are identified as ferrous objects by the present invention, since the resistive signal they generate during the energy absorption phase is short and disappears altogether, once the magnetic domains are maximally aligned with the external field.

The signal that is sampled after the cessation of the coil pulse is essentially resistive in nature. After demodulation in the processor, the signal assumes a shape that is illustrated by trace 502 in FIG. 5-A. It can be seen that there is a DC component present, shown as the distance between the flat portions of trace 502 and the baseline 500.

Since the DC component would affect the detection threshold of the detector, it must be eliminated. This is accomplished by a program loop in the processor. Trace 504 in FIG. 5-B shows the signal after differentiation and trace 508 in FIG. 5-C shows the signal reconstituted by integration. As in mathematical integration, an integration constant must be added to recreate the original signal. In this application, the constant is not added, resulting in the elimination of the DC component. Thus, the signal from a target is brought below the level sensor threshold 510, causing the level sensor to fire at point 509, when the target signal increases sufficiently and to disengage when the signal falls below the threshold.

Although not illustrated, it is obvious to those skilled in the art, that the above-described method does not suffer from the rebound-effect, inherent in the method of capacitive coupling, when subjected to a negative excursion of the signal.

Trace 512, in FIG. 5-D, represents the output of level sensor 826 in FIG. 8.

Zero crossing detector 834, in the same figure, is triggered at point 506 and its output fires pulser 832, whose output is shown as trace 514, in FIG. 5-E.

The signal sampled at the end of the coil-current ramp is also demodulated in a software loop in controller 811, however, owing to the negative feedback loop described above, the signal remains substantially at zero, until the feedback loop is disabled, during the time interval that the eddy-current signal exceeds the detection threshold, as shown in FIGS. 6-B and 6-D.

If the background signal remains constant while the target passes the coil system, detecting the beginning and end of the target signal presents no problem. If, on the other hand, the background signal changes rapidly, as shown by trace 710 in FIG. 7-F, the level sensor may not be able to detect the end of the target signal, reliably.

Therefore, the preferred embodiment of the invention uses a different method of defining the end of the target signal.

Processor 811 measures the time interval between trigger point 509 and center point 506, as shown in FIGS. 5-B and 5-C, and extends center pulse 514, in FIG. 5-E, to the measured length.

Thus, as shown in FIGS. 7-H and 7-I, pulse 512, the output of the level sensor, is terminated by the trailing end 516 of the center pulse. Trace 512, in FIG. 7-G, shows that the level sensor would not be able to terminate the pulse, since the background signal has increased to a level above the triggering threshold.

The degree of mineralization of the ground may also change during the time interval that the target signal is acquired.

Trace 702 in FIG. 7-D shows an increase in the resistive ground signal during the detection of a target. The ground signal is integrated, along with the mutual-inductance signal generated by the target. Trace 704 in FIG. 7-E shows the integral of the combined signals. In the shown instance, the resistive ground signal has outweighed the magnetic inductive-imbalance signal.

To correct for this error, the background signal is sampled immediately after the termination of the target signal, by pulse 602, in FIG. 7-C. Thus, the contribution of the background signal is assessed and subtracted from the composite integral, yielding trace 708, in FIG. 7-E, which correctly identifies the target as ferrous.

In a similar fashion, the reactive ground signal may change while a target is being detected. A correction, as described above, will ensure that the target is correctly identified.

When eddy-current signals and mutual inductance signals are generated by the same target, the demodulated signal envelopes are temporally aligned, as shown in FIGS. 6-A and 6-D.

When several targets are in close proximity, the differentiated signals from the eddy-current and mutual-inductance channels are likely to cross zero at different times, as shown by traces 504 and 516, in FIG. 5-F.

Both zero crossings generate pulses, with rising edges 514 and 520, respectively. The misalignment between the pulses is used to generate "misalignment pulse" 522, whose length is a measure of the degree of misalignment.

When the length of pulse 522 exceeds a predetermined value, it is assumed that multiple targets are present and that the output of the mutual inductance channel is not valid for all targets. The check for "envelope alignment" in the flow chart of FIG. 10 refers to this test.

Thus, when identification of the target is unreliable, owing to the presence of multiple targets, it is assumed that one of the targets may be valuable, and a non-ferrous indication is issued.

Other criteria for misalignment may also be used. For example, if two targets are vertically aligned but have different sizes, the signal envelopes peak at the same time, but the beginning and ending points occur at different times. This is another criterion that can be used to detect the presence of multiple targets.

In a stationary installation of the metal detector, such as might be applicable to tramp metal detection on a conveyor belt, the current consumption of the detector is not critical.

Thus, the length of the current ramp 302, as shown if FIG. 3-A, can be extended to a point where it is certain that the eddy currents in likely targets have decayed to substantially zero, at the end of the ramp.

In battery powered detectors however, this approach represents wasted energy, leading to shortened battery life.

Since data elicited from signals present during the ramp are not useful until a target has in fact been detected, the ramp can be very short, until a signal exceeding the detection threshold has been detected after the coil pulse.

Furthermore, a sufficient length of the ramp can be determined by sampling the target signal at least twice, as shown in FIG. 3-C, at intervals 326 and 328.

When the signals at the two sampling intervals are essentially the same, the ramp is long enough, and the signal sampled at interval 328 represents substantially a mutual inductance signal.

The flow chart for the preferred embodiment is shown in FIG. 10.

DESCRIPTION OF THE OPERATION OF AN ALTERNATE EMBODIMENT

It also possible to elicit the magnitude of the mutual inductance signal without waiting for the eddy-current signal to decay to essentially zero.

When the time constant of the target signal is calculated from samples taken during sampling intervals 342 and 344, in FIG. 4-C, it will be found that the computation yields a value that is different from the one obtained when using data from sampling intervals 326 and 328. This is caused by the addition of the mutual-inductance signal to the eddy-current signal from the target.

A ferrous target causes a mutual-inductance signal which creates the appearance of a shorter time constant.

Thus, a simple comparison of time constants yields information about the nature of the target.

With a shorter ramp, less current is expended, but more time is required to process the information. In a portable detector, where the search coil moves relatively slowly over the ground, this is not seen as a limitation.

A flow chart corresponding to the above embodiment is shown in FIG. 11

DESCRIPTION OF THE OPERATION OF AN ADDITIONAL ALTERNATE EMBODIMENT

In this procedure, a correction signal is added to the samples taken during the current ramp. When the magnitude and polarity of the correction signal is such that the computed time constants are the same for the signals during and after the current ramp, the correction signal represents the inductive imbalance during the current ramp.

The polarity of the correction signal is then an indication of the nature of the target.

A flow chart corresponding to the above embodiment is shown in FIG. 12.

RAMIFICATIONS AND SCOPE OF THE INVENTION

The above embodiments are not to be construed as limitations as to the manner in which the invention can be implemented, but rather as examples of many possibilities. Likewise, the applications of the invention should not be considered to be limited to any one field. The ability of a detector to reliably distinguish between ferrous and non-ferrous metals may find use in treasure hunting, mining, recycling, detection of land mines, security and in other fields.

Consequently, the scope of the invention should not be determined by the specifications but rather by the claims that follow.

I claim:

1. In a pulse-induction-type metal detector having a transmitter coil, a receiver coil, output means and coil-excitation means providing a coil pulse, the improvement comprising:
   (a) means to distinguish in signal received by said receiver coil, between signal components that are caused by mutual inductance between said transmitter and receiver coils and the signal components caused by eddy currents in a target;
   (b) compensating means to reduce said signal components caused by mutual inductance between said transmitter and receiver coils to essentially zero;
   (c) means to deactivate said compensating means while the signal intercepted by said receiver coil, after said coil pulse exceeds a predetermined amplitude, and
   (d) means to provide an unambiguous indication of the ferrous or non-ferrous nature of the target, based on the polarity of said signal component caused by mutual inductance between said transmitter and receiver coils, while said compensating means is deactivated.

* * * * *